(12) United States Patent
Iwashita et al.

(10) Patent No.: US 7,868,569 B2
(45) Date of Patent: Jan. 11, 2011

(54) MOTOR DRIVING APPARATUS

(75) Inventors: Yasusuke Iwashita, Minamitsuru-gun (JP); Mamoru Yaeshima, Minamitsuru-gun (JP); Yuuichi Yamada, Minamitsuru-gun (JP); Masatomo Shirouzu, Minamitsuru-gun (JP); Koujirou Sakai, Minamitsuru-gun (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 150 days.

(21) Appl. No.: 12/342,711

(22) Filed: Dec. 23, 2008

(65) Prior Publication Data

US 2009/0218976 A1 Sep. 3, 2009

(30) Foreign Application Priority Data

Feb. 28, 2008 (JP) ............................. 2008-048212

(51) Int. Cl.
H02P 3/14 (2006.01)
(52) U.S. Cl. .................... 318/376; 318/801; 318/440; 318/722; 320/135; 320/137; 320/166; 320/107; 320/127
(58) Field of Classification Search ................ 318/801, 318/802, 803, 806, 798, 139, 440, 376, 722; 320/135, 127, 146, 132, 136, 137, 166, 107
See application file for complete search history.

(56) References Cited

U.S. PATENT DOCUMENTS

| | | | | |
|---|---|---|---|---|
| 4,340,823 A * | 7/1982 | Miyazawa | .................... | 307/66 |
| 4,482,031 A * | 11/1984 | Yoshida et al. | .............. | 187/296 |
| 4,779,709 A * | 10/1988 | Mitsui et al. | ................. | 187/296 |
| 4,965,709 A * | 10/1990 | Ngo | ............................ | 363/37 |
| 5,396,164 A * | 3/1995 | Anegawa | ................... | 320/143 |
| 6,133,651 A * | 10/2000 | Kono et al. | .................... | 307/64 |
| 6,204,627 B1 * | 3/2001 | Watanabe et al. | ........... | 318/729 |
| 6,275,393 B1 * | 8/2001 | Baudelot et al. | .............. | 363/37 |
| 6,333,611 B1 | 12/2001 | Shibuya et al. | | |
| 7,042,178 B2 * | 5/2006 | Yamada et al. | .............. | 318/376 |
| 7,227,323 B2 * | 6/2007 | Yamada et al. | .............. | 318/376 |
| 7,432,616 B2 * | 10/2008 | Hatai et al. | .................... | 307/66 |
| 7,584,813 B2 * | 9/2009 | Yoshida | ................... | 180/65.29 |
| 7,633,249 B2 * | 12/2009 | Sekimoto et al. | ......... | 318/254.1 |

(Continued)

FOREIGN PATENT DOCUMENTS

JR 8-256439 10/1996

(Continued)

OTHER PUBLICATIONS

Japanese Notification of Reasons for Refusal drafted May 7, 2009 issued in Japanese Application No. 2008-048212 (including a translation thereof).

*Primary Examiner*—Rita Leykin
(74) *Attorney, Agent, or Firm*—Drinker Biddle & Reath LLP

(57) ABSTRACT

A motor driving apparatus comprises a charge/discharge control circuit for controlling charge to or discharge from a capacitor connected in parallel in a link section between a converter and an inverter, and a current control means for controlling discharge current from the charge/discharge control circuit. The current control means controls discharge current from the charge/discharge control circuit based on input current to the inverter or output current from the converter so that output current from the converter is equal to a prescribed value.

8 Claims, 7 Drawing Sheets

U.S. PATENT DOCUMENTS

| | | | |
|---|---|---|---|
| 2001/0017234 A1* | 8/2001 | Suga et al. | 187/290 |
| 2001/0017237 A1* | 8/2001 | Tominaga et al. | 187/290 |
| 2002/0179376 A1* | 12/2002 | Tominaga et al. | 187/290 |
| 2002/0189906 A1* | 12/2002 | Tominaga et al. | 187/290 |
| 2004/0095784 A1* | 5/2004 | Zhou | 363/37 |
| 2004/0245951 A1* | 12/2004 | Yamada et al. | 318/376 |
| 2009/0243522 A1* | 10/2009 | Suhama et al. | 318/376 |

FOREIGN PATENT DOCUMENTS

| | | |
|---|---|---|
| JP | 6-225458 | 8/1994 |
| JP | 8-154345 | 6/1996 |
| JP | 2000-141440 | 5/2000 |

* cited by examiner

MOTOR DRIVING APPARATUS

RELATED APPLICATIONS DATA

This application claims priority under 35 U.S.C. §119 and/or §365 to Japanese Application No. 2008-048212 filed Feb. 28, 2008, the entire contents of which are incorporated herein by reference.

BACKGROUND OF THE INVENTION

1. Field of the Invention

The present invention relates to a motor driving apparatus that supplies, during power running, electric energy stored in a capacitor so as to reduce current supplied from a power source.

2. Description of the Related Art

A motor driving apparatus comprising a converter for converting an AC voltage from an AC power source to a DC voltage, an inverter for converting the converted DC voltage back to an AC voltage, a capacitor connected in parallel with a DC link section between the converter and the inverter, and a charge/discharge control circuit for controlling charge to and discharge from the capacitor is disclosed in, for example, Japanese Patent Application Laid-Open No. 2000-141440.

The relationship between the motor speed, the current of the DC link section, and the power of the DC link section of the motor driving apparatus will be described with reference to the FIG. 10.

The motor speed is shown in the first graph in FIG. 10. In this example shown in FIG. 10, the motor is first accelerated and then decelerated.

The current of the DC link section is shown in the second graph in FIG. 10. During acceleration of the motor, current flows through the DC link section as shown in the graph. When input current to the inverter exceeds a threshold I, a switch of a discharge circuit turns on and electric energy stored in the capacitor is discharged rapidly. As a result, output current from the converter decreases rapidly.

When the motor starts decelerating, regenerative electric energy flows into the capacitor. The surplus regenerative electric energy beyond the capacitance of the capacitor is processed through power source regeneration or resistance discharge.

The power of the DC link section is shown in the third graph. During acceleration of the motor, power is supplied from the power source until output level P is reached and, after output level P is exceeded and the switch of the discharge circuit is turned on, power is supplied from the capacitor. Accordingly, electric energy in the capacitor is discharged rapidly after the switch of the discharge circuit is turned on.

When the motor starts decelerating, regenerative electric energy flows into the capacitor and the surplus regenerative electric energy beyond the capacitance is processed through power source regeneration or resistance discharge.

In the above motor driving apparatus, during power running of the motor, electric energy stored in the capacitor is not controlled or control is made so as to prevent a prescribed current amount from being exceeded after the switch of the discharge circuit is turned on, so electric energy stored in the capacitor is discharged rapidly, making it difficult to supply electric energy from the capacitor to the inverter for a sufficient period of time.

Accordingly, a large-capacity capacitor for storing much electric energy must be used to reduce supply current from the power source to a desired level. In addition, supply current from the power source is interrupted or reduced according to the amount of electric energy supplied from the capacitor to the inverter, so it is difficult to reduce the amount of current from the power source to a desirable level.

SUMMARY OF THE INVENTION

An object of the present invention is to provide a motor driving apparatus for controlling the amount of electric energy supplied from a capacitor so as to limit the current input from a power source to any desired value and for efficiently using electric energy stored in the capacitor so as to reduce the capacitance of the capacitor.

The motor driving apparatus of the present invention comprises a converter for converting an AC voltage from an AC power source into a DC voltage, an inverter for converting the converted DC voltage back into an AC voltage, a capacitor connected in parallel in a link section between the converter and the inverter a charge/discharge control circuit for controlling charge to and discharge from the capacitor, and a current control means for controlling discharge current from the charge/discharge control circuit. The current control means controls the discharge current from the charge/discharge control circuit based on at least one of the following five values so that the input/output current or input/output power of the converter is equal to a prescribed value.

(1) Input current or input power to the inverter
(2) Output power from the inverter
(3) Output power from the motor
(4) Input current or input power to the converter
(5) Output current or output power from the converter A current sensor is used to detect current. A power value is the product of the current detected by the current sensor and the voltage of a circuit in which the current flows. In addition, the above "(2) output power from the inverter" and the above "(3) output power from the motor" can also be calculated and obtained by the control software for controlling the motor.

The current control means may control the discharge current from the charge/discharge control circuit only when at least one of the above values (1) to (5) exceeds a prescribed value of the input/output current or power of the converter.

The motor driving apparatus may have a command value calculation means for calculating the difference between at least one of the values (1) to (3) and the prescribed value as a command value. The current control means may control discharge current from the charge/discharge control circuit so that the value of the discharge current is equal to a command value calculated by the command value calculation means.

In addition, the current control means may have a comparator with hysteresis that receives the command value and the amount of current flowing through the charge/discharge control circuit to control discharge current from the charge/discharge control circuit based on an output signal from the comparator. The current control means may control discharge current from the charge/discharge control circuit using the command value and a PWM command generated through current control based on the amount of current flowing through the charge/discharge control circuit in order to make the amount of current flowing through the charge/discharge control circuit coincide with the command value.

The motor driving apparatus may have a low-pass filter for reducing an effect of high frequency components superimposed on the command value. The low-pass filter may take the maximum value within a prescribed period of the command value as a command value.

The current control means may feed discharge current from the charge/discharge control circuit feeds when the value (4) or (5) increases to a prescribed value and stops discharge current from the discharge control circuit when the value (4) or (5) decreases to a prescribed value as a result of the feed operation.

The present invention can control and optimize the amount of electric energy supplied from the capacitor and reduce the capacitance of the capacitor because of the above structure.

In addition, the present invention can control the amount of power source current flowing into the motor driving apparatus to a desired value, so the amount of power source current flowing into the motor driving apparatus can be set according to the limit of the power source current of a power source facility for which the motor driving apparatus is to be installed.

BRIEF DESCRIPTION OF THE DRAWINGS

The purposes and features of the present invention, including those described above, will be clarified by reference to the attached drawings in combination with the description of the embodiments presented below. Of these drawings.

DETAILED DESCRIPTION OF THE PREFERRED EMBODIMENTS

Figure 1:
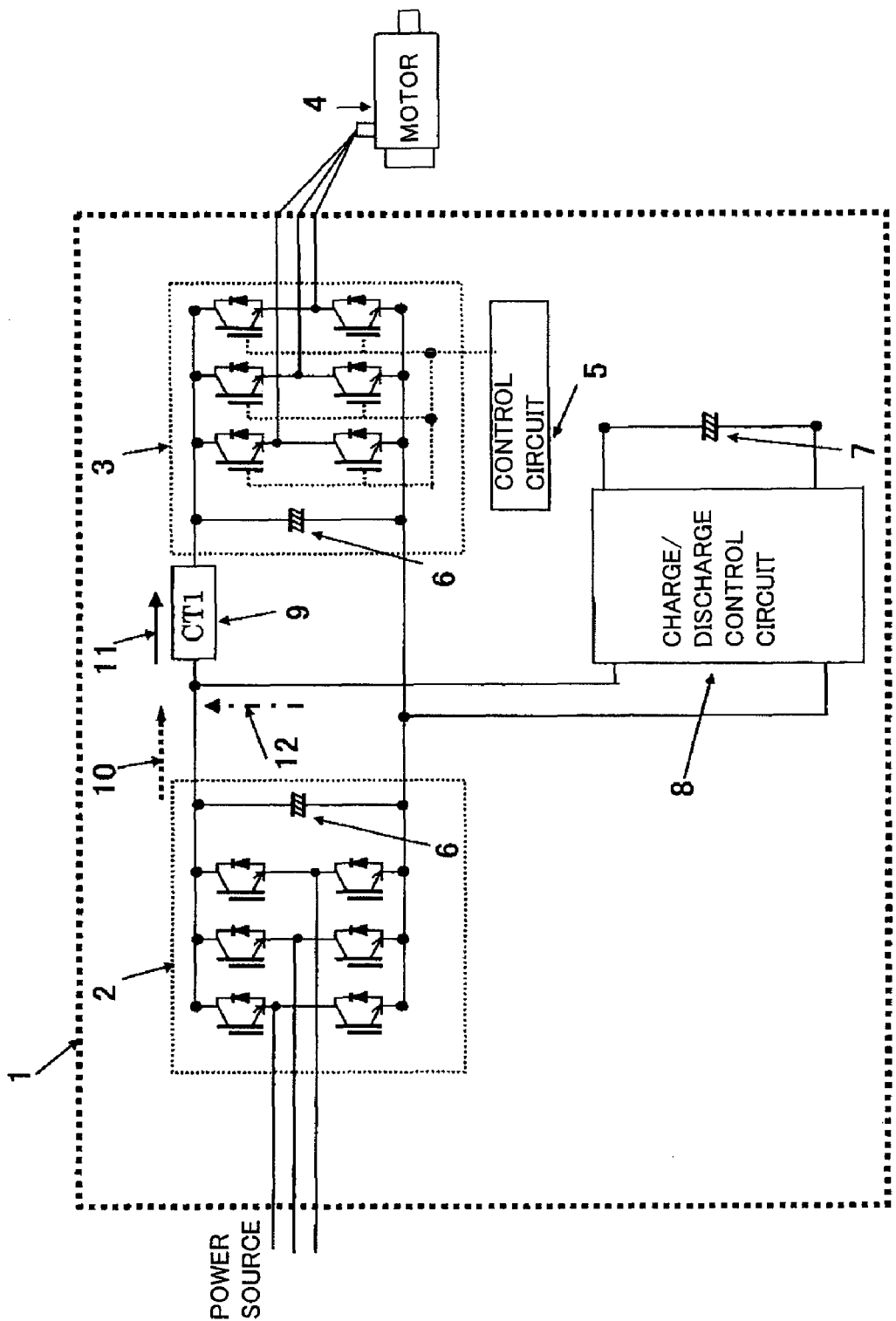
FIG. 1 is a schematic structural diagram showing a first embodiment of a motor driving apparatus according to the present invention.

FIG. 1 is a schematic structural diagram showing a first embodiment of a motor driving apparatus according to the present invention.

A voltage is supplied to a motor driving apparatus 1 in this embodiment by a three-phase AC power source. A converter 2 converts the supplied AC voltage into a DC voltage. An inverter 3 converts the converted DC voltage into an arbitrary AC voltage of an arbitrary frequency and supplies it to a motor 4. A smoothing capacitor 6 is a DC link that is connected between the converter 2 and the inverter 3, smoothes a DC voltage converted by the converter 2, and inputs the smoothed DC voltage to the inverter 3.

The converter 2 includes bridge circuits comprising power elements (for example, transistors) and anti-parallel diodes connected to the power elements. During power running, the converter 2 converts a three-phase AC power source into a DC voltage through full wave rectification using six diodes; during power regeneration, the converter 2 sends regenerative power to the power source by driving six power elements.

The inverter 3 includes bridge circuits comprising power elements (for example, transistors) and anti-parallel diodes connected to the power elements. The on/off control of these power elements is made by an inverter control circuit 5 to supply an arbitrary AC voltage of an arbitrary frequency to the motor 4.

A first current sensor 9 (CT1) measures the amount of current flowing into the inverter 3.

A capacitor 7 is connected in parallel with the smoothing capacitor 6 via a charge/discharge control circuit 8. The capacitor 7 supplies electric energy to the inverter 3 or stores regenerative energy under control of the charge/discharge control circuit 8. The charge/discharge control circuit 8 will be described in detail below with reference to FIG. 2.

Figure 2:
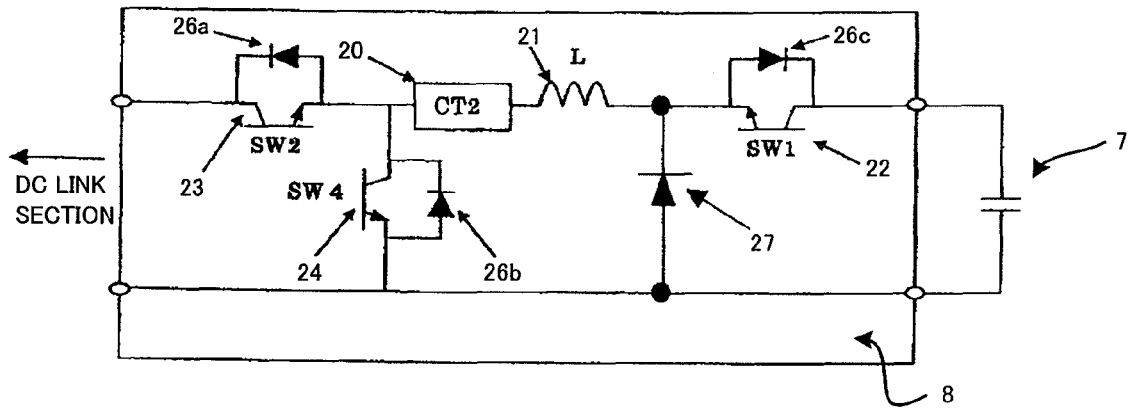
FIG. 2 is a schematic structural diagram showing a charge/discharge control circuit of the motor driving apparatus shown in FIG. 1.
Figure 2:
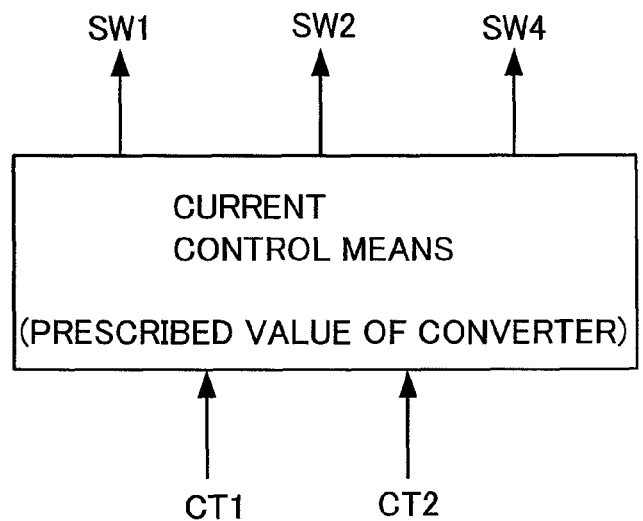

FIG. 2 is a schematic structural diagram showing an example of the charge/discharge control circuit 8 of the motor driving apparatus 1 shown in FIG. 1. This the charge/discharge control circuit 8 is connected to the motor driving apparatus 1 in parallel with the smoothing capacitor 6, which is the DC link section, in the motor driving apparatus 1, as described with reference to FIG. 1. The charge/discharge control circuit 8 comprises a second current sensor 20 (CT2), a DC reactor 21, a discharge control switch 22 (SW1), a charge control switch 23 (SW2), a voltage boost switch 24 (SW4), and diodes 26a, 26b, and 26c. IGBT or the like can be used for the discharge control switch 22, the charge control switch 23, and the voltage boost switch 24. Reference numeral 27 denotes a diode.

The operation of the charge/discharge control circuit 8 shown in FIG. 2 will be described below. To store electric energy in the capacitor 7, turn on the charge control switch 23 (SW2), turn off the discharge control switch 22 (SW1), and turn off the voltage boost switch 24 (SW4). This causes electric energy in the DC link section (the smoothing capacitor 6) to be charged in the capacitor 7 through the charge control switch 23 (SW2), DC reactor 21, and diode 26c.

To discharge electric energy charged in the capacitor 7 through the charge/discharge control circuit 8, turn on the discharge control switch 22 (SW1), turn off the charge control switch 23 (SW2), and switch over the voltage boost switch 24 (SW4) between on and off quickly. Electric energy stored in reactor 21 as magnetic energy when the voltage boost switch

24 (SW4) was turned on flows into the DC link section (the smoothing capacitor 6) through diode 26*a* when the voltage boost switch 24 (SW4) is turned off and is supplied to the inverter 3.

Alternatively, the discharge control switch 22 (SW1) can be switched over between on and off by an electric control means to supply electric energy stored in the capacitor 7 to the inverter 3. The discharge control switch 22 (SW1) is turned on or off based on the current detection value of the first current sensor 9 (CT1) or the second current sensor 20 (CT2).

Figure 3:
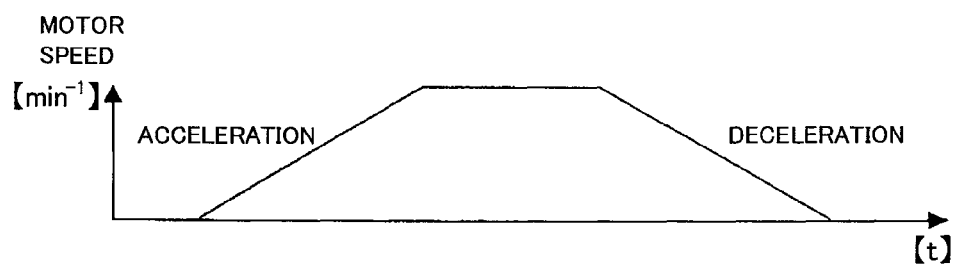
FIG. 3 is a graph showing the motor speed when a motor accelerates and decelerates.

Next, how the capacitor 7 is charged or discharged under control of the charge/discharge control circuit 8 will be described with reference to the case where the motor 4 (see FIG. 1) accelerates or decelerates as shown in FIG. 3.

As shown in FIG. 3, during power running of the motor 4, the motor 4 accelerates as inverter input current 11 that flows into the inverter 3 increases. In this example, the charge/discharge control circuit 8 is controlled so that electric energy stored in the capacitor 7 starts discharging when inverter input current 11 detected by first current sensor 9 (CT1) exceeds threshold I, which is the limit of power source current. Threshold I above may be set to the limit of power source current or less.

Figure 4:
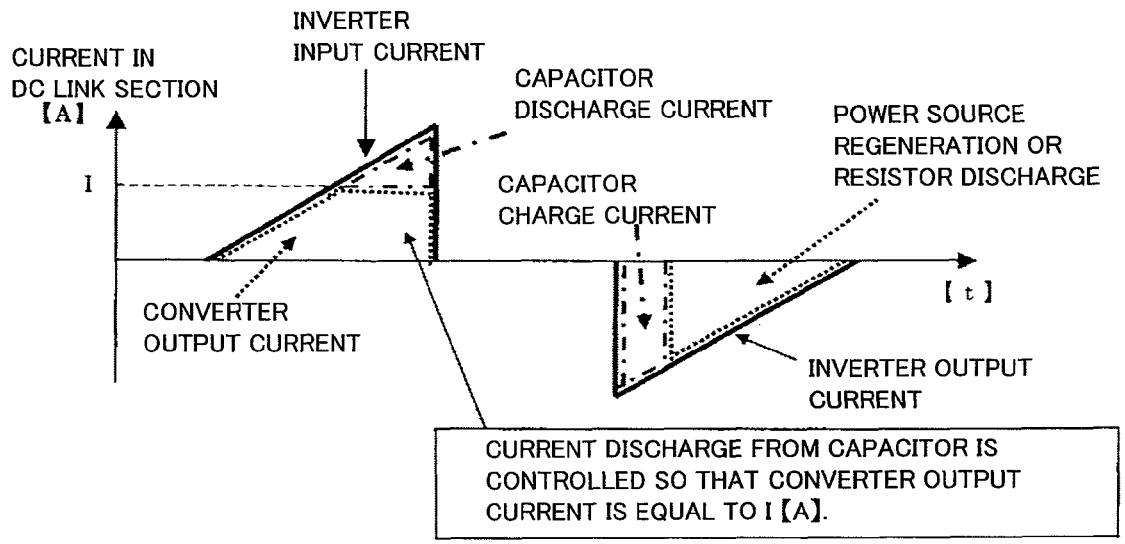
FIG. 4 is a graph showing the amount of current in a DC link section of an inverter or converter of the motor driving apparatus shown in FIG. 1.
Figure 5:
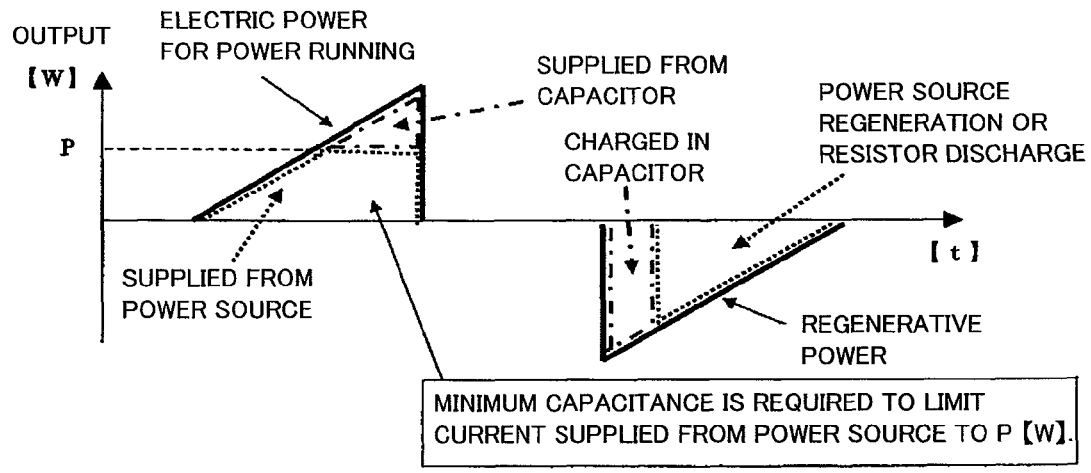
FIG. 5 is a graph showing the amount of power supplied to the motor shown in FIG. 1.

As shown in FIG. 4, control can also be made so that, when input current 11 to the inverter 3 exceeds threshold I, the difference between the amount of current from first current sensor 9 (CT1) that detects input current 11 to the inverter 3 and the amount of current from second current sensor 20 (CT2) that detects discharge current flowing from the charge/discharge control circuit 8 may agree with the output current (prescribed value) of the converter 2.

The charge/discharge control circuit 8 can also be controlled so that discharge current from the capacitor 7 is supplied to the inverter 3 only when output current 10 from the converter 2 exceeds a prescribed value. This type of control enables electric energy stored in the capacitor 7 to be used efficiently.

Regenerative power is charged in the capacitor 7 during deceleration of the motor. The surplus regenerative power after the capacitor 7 is fully charged may be processed through power source regeneration or resistance discharge.

According to the above example, discharge of electric energy stored in the capacitor 7 is controlled using inverter input current 11 to be input to the inverter 3 that is detected by first current sensor 9 (CT1). Next, an example of controlling the discharge of electric energy stored in the capacitor 7 using a control command value for the inverter control circuit 5 that controls the motor 4 will be described below.

The current detected by first current sensor 9 (CT1) is inverter input current 11. This current is determined by switching over the transistors in the inverter 3 using the inverter control circuit 5 in order to control the motor 4 based on the command.

Figure 6:
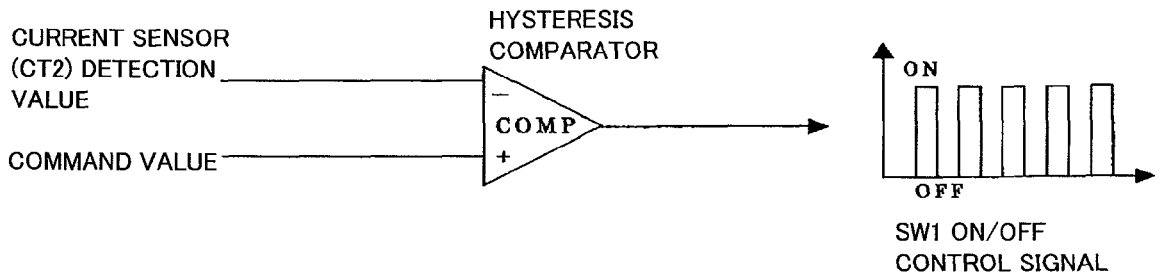
FIG. 6 shows a hysteresis comparator that compares the amount of current from the current sensor (CT2) of the charge/discharge control circuit shown in FIG. 2 with an arbitrary command value.
Figure 7:
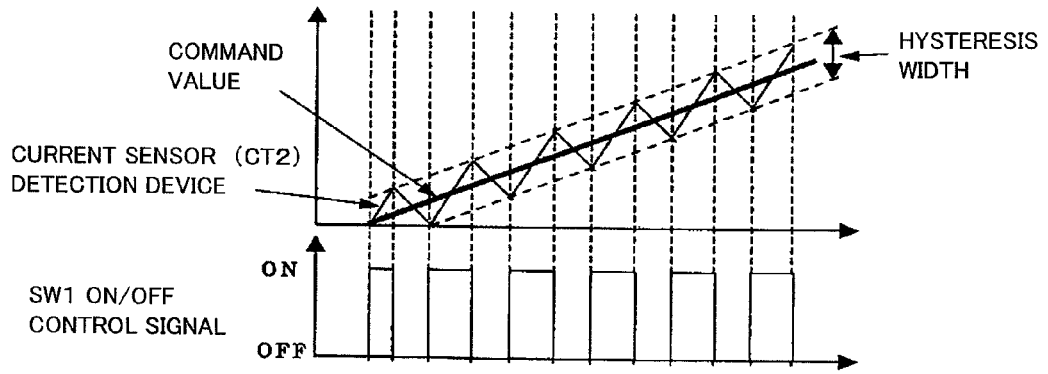
FIG. 7 shows the relationship between command values and detection values of the current sensor (CT2) when hysteresis control is made in the motor driving apparatus shown in FIG. 1.

FIG. 6 shows a hysteresis comparator that compares the current value from second current sensor 20 (CT2) that detects discharge current flowing from the charge/discharge control circuit 8 with an arbitrary command value. This hysteresis comparator makes the current value from second current sensor 20 (CT2) coincide with an arbitrary command value so that the discharge of the capacitor can be controlled on the basis of the arbitrary command value. The discharge control switch 22 (SW1) of the charge/discharge control circuit 8 is turned on or off based on the output of the hysteresis comparator. As shown in FIG. 7, if a command value+α<detection current value of the second current sensor (CT2), then the output of the hysteresis comparator is turned off from on, and if a command value−β>detection current value of the second current sensor (CT2), on the other hand, then the output of the hysteresis comparator is turned on from off, thereby enabling the current flowing through the charge/discharge control circuit 8 to follow an arbitrary command value; where α and β are constants that give hysteresis widths.

Figure 8:
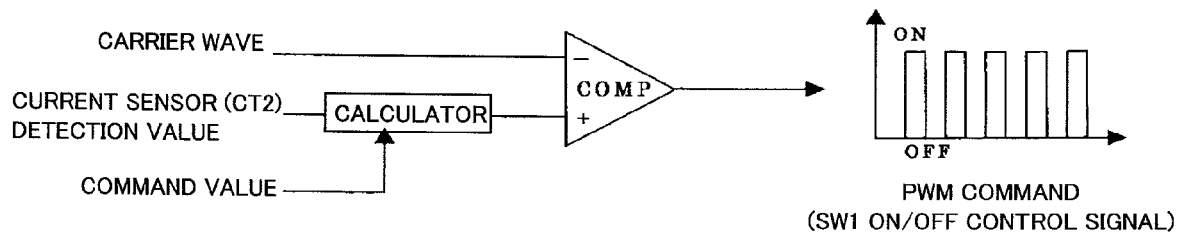
FIG. 8 shows a circuit that generates a PWM control signal.
Figure 9:
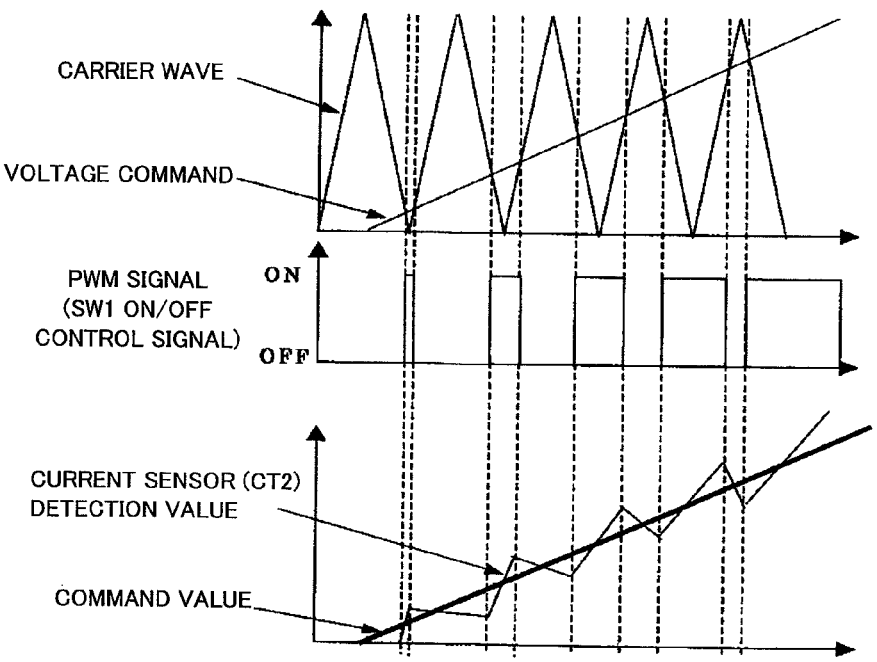
FIG. 9 describes PWM control.
Figure 10:
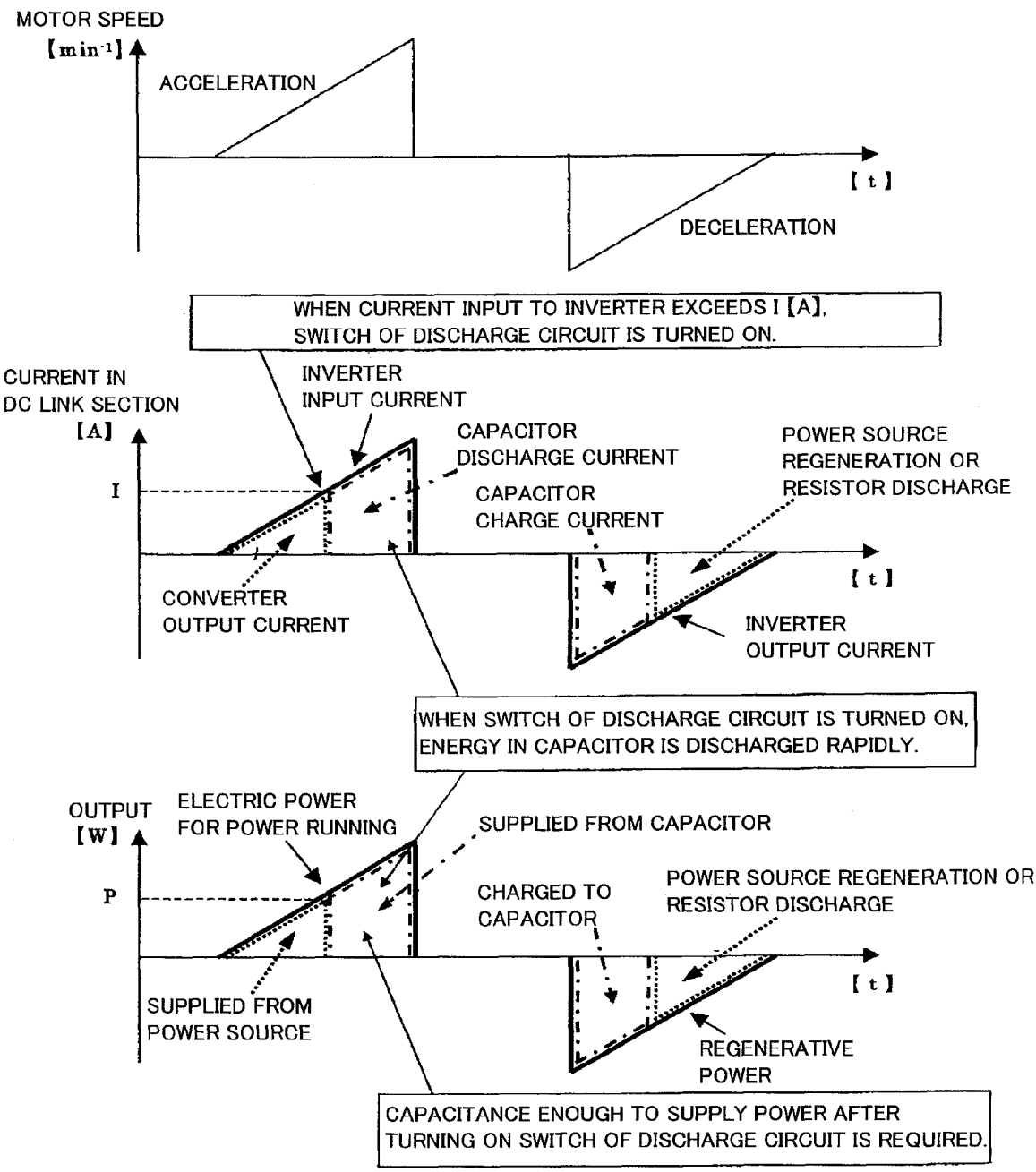
FIG. 10 indicates graphs showing the motor speed when the motor accelerates and decelerates, the amount of current in a DC link section in an inverter or converter of a conventional motor driving apparatus, and power supplied to the motor.

FIG. 8 shows a circuit that generates a PWM signal. If the discharge control switch 22 (SW1) is turned on or off through PWM control, the amount of current detected by current sensor 20 (CT2) can follow an arbitrary command value.

The above-mentioned "arbitrary command value" for discharge control of the capacitor 7 is the difference between the amount of input current 11 to the inverter 3 and the current limit, which is also threshold I or a prescribed value, of converter output current 10 from the converter 2, as shown in FIG. 4.

Next, a means for removing high frequency components superimposed on a command value will be described below. A low-pass filter that takes the maximum value within a prescribed period, which serves as means for removing high frequency components, will be described below.

Reduction of frequency components of (1/X) Hz or more superimposed on an input signal S will be considered below.

N registers R[i] are prepared (i=0 to N−1, N is a positive number).

Input signal S is sampled at intervals of X/(N−1) and the sampled values are stored in the registers beginning with R[0]. Each time a new value is stored at intervals of X/(N−1), the maximum value of stored ones is output from the filter.

When a value is stored in R[N−1] (the value in R[N−1] is the latest at that point), the next value sampled is stored in R[0] again.

R[0]: Stores the value sampled X seconds before.

...

R[N−3]: Stores the value sampled 2X/(N−1) seconds before.

R[N−2]: Stores the value sampled X/(N−1) seconds before.

R[N−1]: Stores the current (latest) value.

The above low-pass filter can reflect an abrupt rise of the input signal on an output signal similarly while removing high-frequency components.

Next, an example of the low-pass filter that takes the maximum value within a prescribed period will be described below.

In the motor driving apparatus 1 shown in FIG. 1, a specific command value is given to the charge/discharge control circuit 8 to limit an output signal from the converter 2 during acceleration of the motor 4 to Iref(t) or less.

The amount of current flowing through the link section between the converter 2 and the inverter 3 is represented by [Converter output current+Discharge current from charge/discharge control circuit].

When the output current from the converter 2 is controlled to Iref(t), the command value of charge current of the charge/discharge control circuit 8 is represented by [Value detected by the first current sensor (CT1) (inverter input current)−Iref(t)].

In this case, power source ripple components of the three-phase AC power source are superimposed on the value detected by the first current sensor (CT1) (inverter input current), so it is necessary to remove the power source ripple components. Otherwise, the power source ripple components will be superimposed on the command value.

If a RC filter with a time constant of 3 to 4 milliseconds is used for output of the first current sensor (CT1) so as to remove the power source ripple components (for example, 50 Hz to 300 Hz), the command value is delayed due to the time constant and a response to an abrupt rise of load (output from the first current sensor (CT1)) is delayed.

Accordingly, if a low-pass filter that takes the maximum value within a time period of 3 to 4 milliseconds is used for output of the first current sensor (CT1), it is possible to reduce an effect of power source ripple components without delaying a response to an abrupt rise of load.

Next, a second embodiment of the motor driving apparatus according to the present invention will be described with reference to FIGS. 11 to 14.

According to this embodiment, current control means in the motor driving apparatus stops discharge current from the charge/discharge control circuit when the amount of input current or input power of the converter or the amount of output current or output power of the converter is reduced to a prescribed value.

Figure 11:
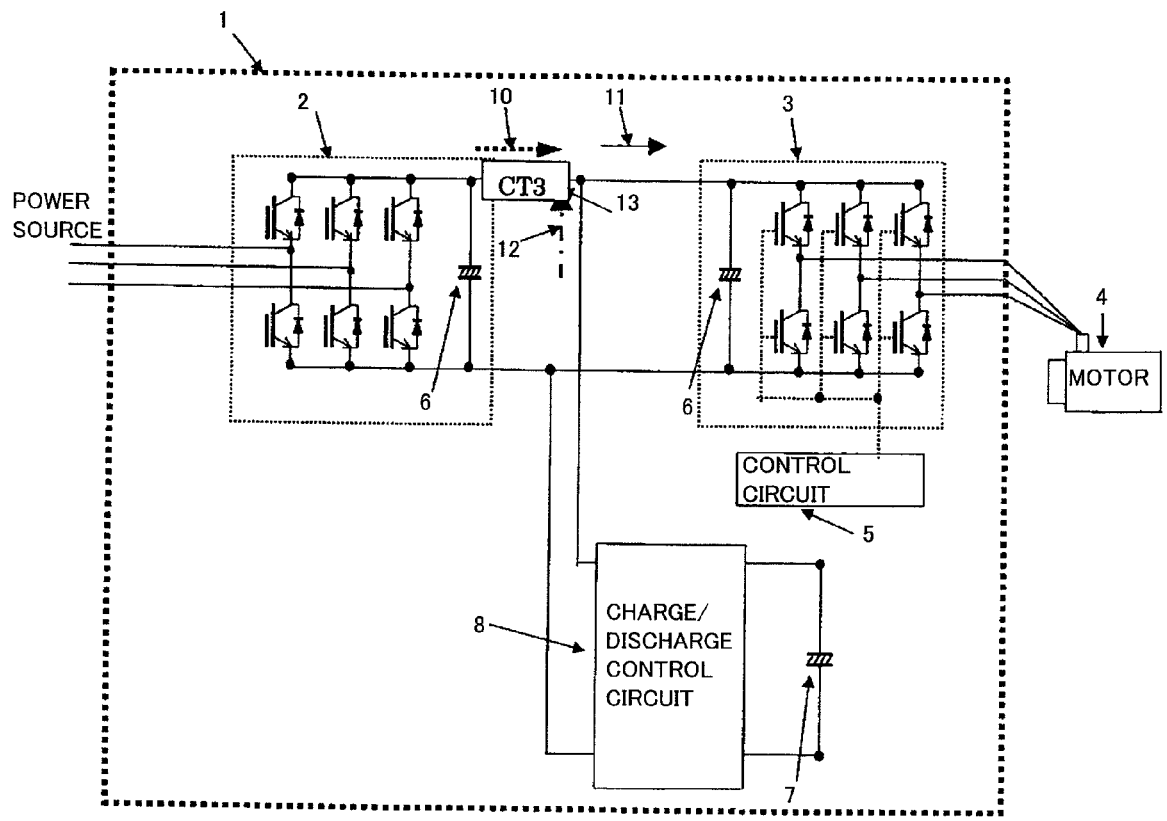
FIG. 11 is a schematic structural diagram showing a second embodiment of the motor driving apparatus of the present invention.

In FIG. 11, a third current sensor (CT3) detects converter output current 10.

Figure 12:
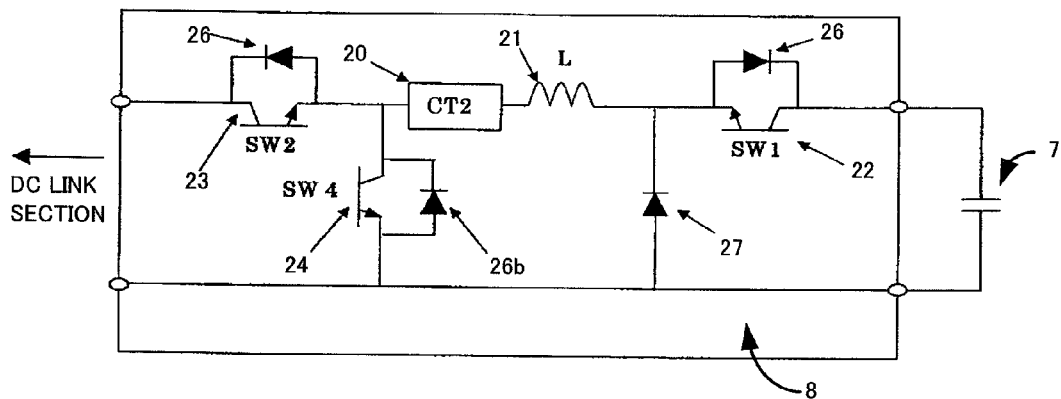
FIG. 12 is a schematic structural diagram showing the charge/discharge control circuit of the motor driving apparatus shown in FIG. 11.
Figure 13:
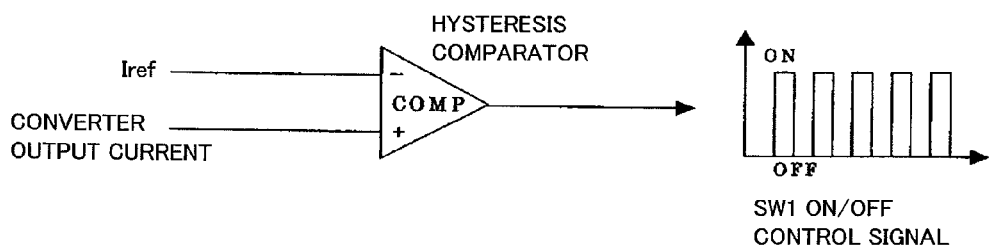
FIG. 13 shows a hysteresis comparator that compares the amount of current from the current sensor (CT2) of the charge/discharge control circuit shown in FIG. 12 with an arbitrary command value.

FIG. 13 shows a hysteresis comparator that compares converter output current 10 detected by the current sensor 13 (CT3) with a prescribed current value; the hysteresis comparator turns on the discharge control switch 22 (SW1) of the charge/discharge control circuit 8 shown in FIG. 12 when converter output current 10 is equal to or more than a prescribed value.

Figure 14:
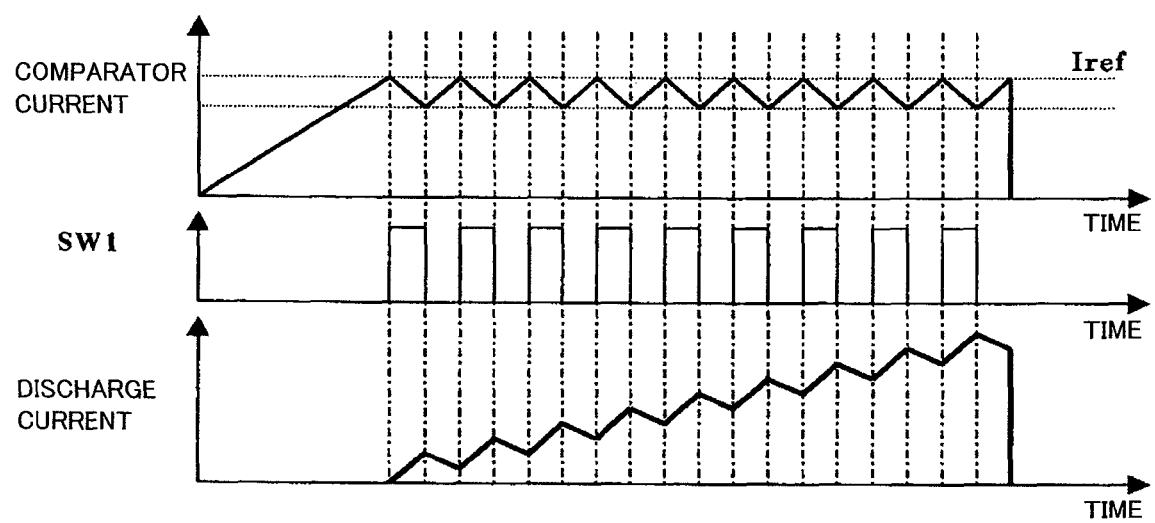
FIG. 14 indicates that capacitor charge/discharge current in the motor driving apparatus shown in FIG. 11 flows when a switch SW1 is on and the amount of current is inverter input current (prescribed value) minus converter output current.

The amount of inverter input current 11 shown in FIG. 11 depends on the output of the motor 4 and is not affected by the amount of capacitor charge/discharge current 12 that flows when the discharge control switch 22 (SW1) of the charge/discharge control circuit 8 shown in FIG. 12 is turned on. Accordingly, when capacitor charge/discharge current 12 flows, converter output current 10 is reduced as shown in FIG. 14. This phenomenon occurs because the following equation holds.

Converter output current 10+Capacitor charge/discharge current 12=Inverter input current 11

When the output current of the converter is reduced to a prescribed value or less in the hysteresis comparator, the discharge control switch 22 (SW1) is turned off. The above operation is repeated so that the converter output current is controlled to a prescribed value.

The invention claimed is:

1. A motor driving apparatus which comprises a converter for converting an AC voltage from an AC power source into a DC voltage, an inverter for converting the converted DC voltage back into an AC voltage, a capacitor connected in parallel in a link section between the converter and the inverter, and a charge/discharge control circuit for controlling charge to and discharge from the capacitor, wherein a smoothing capacitor is connected between the converter and the inverter, and the capacitor connected in parallel in the link section is connected in parallel with the smoothing capacitor via the charge/discharge control circuit, and wherein said motor driving apparatus further comprises a current control means for controlling discharge current from the charge/discharge control circuit based on at least one of the following values (1) to (5) so that input/output current or input/output power of the converter is equal to a prescribed value:

(1) input current or input power to the inverter;
(2) output power from the inverter;
(3) motor output power;
(4) input current or input power to the converter; and
(5) output current or output power from the converter.

2. The motor driving apparatus according to claim 1, wherein said current control means controls discharge current from the charge/discharge control circuit only when at least one of the value (1) to (5) exceeds the prescribed value of the input/output current or power of the converter.

3. The motor driving apparatus according to claim 1, further comprising a command value calculation means for calculating a difference between at least one of said value (1) to (3) and the prescribed value as a command value, wherein said current control means controls discharge current from the charge/discharge control circuit so that the value of the discharge current is equal to the command value calculated by the command value calculation means.

4. The motor driving apparatus according to claim 3, wherein the current control means has a hysteresis comparator receiving said command value and the amount of current flowing through the charge/discharge control circuit and controls discharge current from the charge/discharge control circuit based on an output signal from the hysteresis comparator.

5. The motor driving apparatus according to claim 3, wherein the current control means controls discharge current from the charge/discharge control circuit using the command value and a PWM command generated through current control based on the amount of current flowing through the charge/discharge control circuit so that the amount of current flowing through the charge/discharge control circuit is equal to said command value.

6. The motor driving apparatus according to claim 3, further comprising a low-pass filter for reducing an effect of high frequency components superimposed on said command value.

7. The motor driving apparatus according to claim 6, wherein the low-pass filter takes the maximum value of said command value within a prescribed time period as a command value.

8. The motor driving apparatus according to claim 1, wherein the current control means feeds discharge current from the charge/discharge control circuit when said value (4) or (5) increases to a prescribed value and stops the discharge current from the charge/discharge control circuit when said value (4) or (5) decreases to a prescribed value as a result of the feed operation.

* * * * *